Nov. 18, 1924.
E. E. GOVIN
AUTOMOBILE CHAIN
Filed Nov. 14, 1923
1,515,675
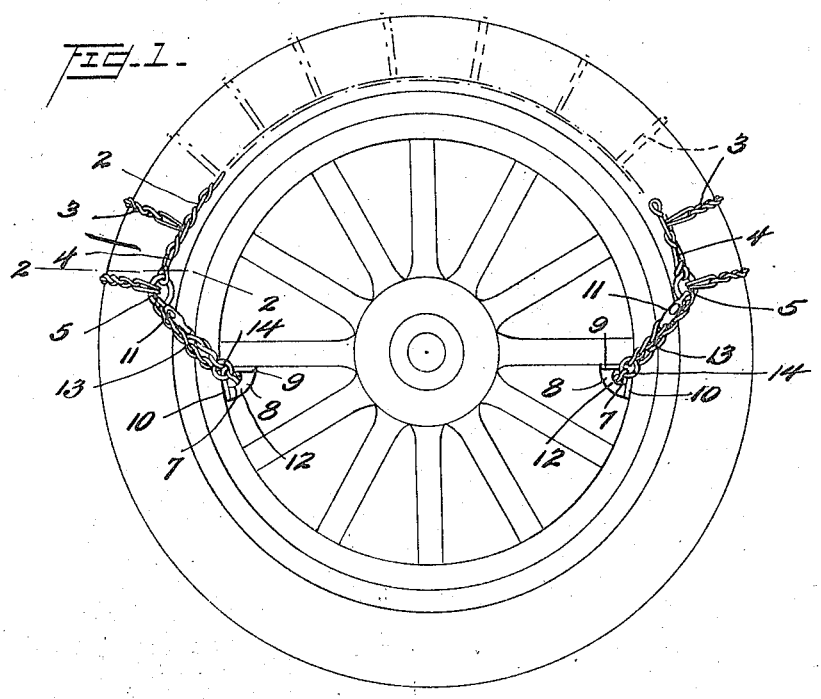
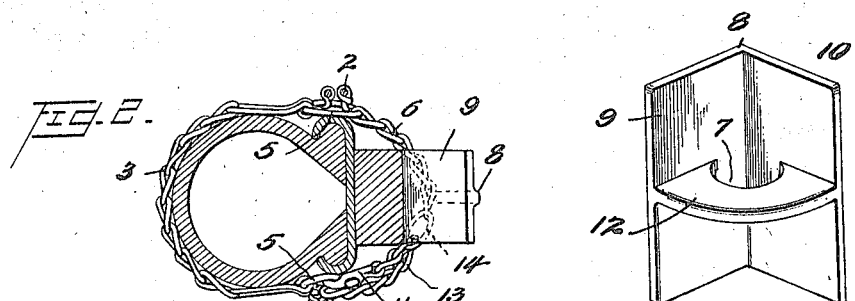
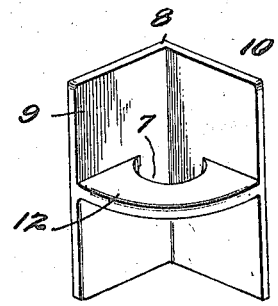
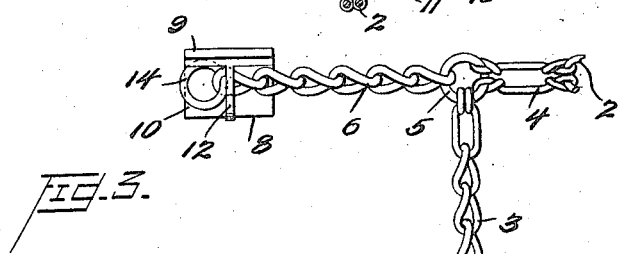
Inventor
E. E. Govin
By John Boyle
Attorney Patented Nov. 18, 1924.

1,515,675

UNITED STATES PATENT OFFICE.

EDWARD E. GOVIN, OF MENOMONIE, WISCONSIN.

AUTOMOBILE CHAIN.

Application filed November 14, 1923. Serial No. 674,688.

*To all whom it may concern:*

Be it known that I, EDWARD E. GOVIN, citizen of the United States, residing at Menomonie, in the county of Dunn and State of Wisconsin, have invented certain new and useful Improvements in Automobile Chains, of which the following is a specification.

My invention relates to a half chain for automobile wheels to be used as an emergency chain, when the other chains cannot be put on; as for instance, when the wheel drops into a mud-hole, or a soft sandy spot or when the wheel gets on a side slope where it is wet and slippery.

One of the objects of the invention is to provide a device of this character which is simple and durable in construction and which is easily put on and repaired.

A further object is to provide securing means which will not chafe the wheel and spokes, which can be adapted to any wheel without change and when put on can be drawn up tight and hold its place well.

With these and other objects in view, my invention consists in certain novel and peculiar features of construction and combination of parts as hereinafter described and claimed; and, in order that it may be fully understood, reference is to be had to the accompanying drawing, in which:—

Figure 1 is an elevation,

Fig. 2 is a section on the line 2—2 of Fig. 1,

Fig. 3 is a view of the fastening means carried by the chain,

Fig. 4 is a perspective view of the fastening block.

The main part of the chain is made up of the parallel side chains 2 and transverse chains or members 3, similar to the ordinary chains. Near the end of each side chain is a specially shaped link 4 which engages with a ring 5. Secured to one of the rings 5 is a piece of chain 6 having a ring 14 at its end and a steel block 8 intermediate its ends. Secured to the other ring 5 is a slightly longer piece of chain 13, provided with a snap hook 11.

The steel block 8 comprises right angled portions 9 and 10 which are adapted to lie against the spoke and felly of the wheel respectively. Connecting the portions 9 and 10 intermediate their ends is a web portion 12, in which is the aperture 7 through which the chain 6 passes.

To place the chain in position, lay it over the top of the tire, so that the steel blocks will be on the inside of the wheel. Then pull the steel blocks through under the spoke on each side of the wheel. Then take the part of the chain that has the snap hook 11 on it and run it through the ring 14; place the steel block against the rim of the wheel and on the under side of the spoke; draw the chain that has the snap hook on it up tight and snap it into the side chain.

From the above description it will be apparent that I have produced a device of the character described, which possesses all the features enumerated as desirable, and while I have illustrated and described the preferred form of the invention, it will be understood that I reserve the right to all changes properly falling within the scope and spirit of the appended claims.

Therefore what I claim as new and desire to secure by Letters Patent, is:—

1. An anti-skid chain for automobile wheels, comprising a transverse member, a cross portion of chain connected with said member and adapted to fit in the angle between a spoke and the felly and comprising two parts, and a member loosely carried by one of the said parts and fitting in the said angle.

2. An anti-skid chain for automobile wheels, comprising a transverse member, a portion of chain secured to one end of the transverse member, a metal block carried by the said portion, and means for connecting the said portion of chain to the other end of the transverse member with the metal block fitting in the angle between a spoke and the felly.

3. An anti-skid chain for automobile wheels, comprising a transverse member, a cross portion of chain secured to each end of the transverse member, a metal block slidably carried by one portion and adapted to fit in the angle between a spoke and the felly, and means for connecting the two cross portions of the chains together.

4. An anti-skid chain for automobile wheels, comprising a transverse member, a cross portion of chain secured to each end of the transverse member, a metal block comprising angled portions adapted to lie against a spoke and the felly of the wheel respectively, a web portion connecting the angled portions and having an aperture therein and through which one of the cross portions passes, and means for connecting the free ends of cross portions.

In testimony whereof I affix my signature.

EDWARD E. GOVIN.